US011240048B2

(12) United States Patent
Dai et al.

(10) Patent No.: US 11,240,048 B2
(45) Date of Patent: Feb. 1, 2022

(54) SYSTEMS AND METHODS FOR WAKING A NETWORK INTERFACE DEVICE IN A LOW POWER MODE

(71) Applicant: Marvell Asia Pte, Ltd. (Registration No. 199702379M), Singapore (SG)

(72) Inventors: Shaoan Dai, San Jose, CA (US); Wyant Chan, Mountain View, CA (US); Xing Wu, Palo Alto, CA (US); Liang Zhu, Shanghai (CN); Hon Wai Fung, Newark, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/811,956

(22) Filed: Mar. 6, 2020

(65) Prior Publication Data

US 2020/0287730 A1   Sep. 10, 2020

(30) Foreign Application Priority Data

Mar. 6, 2019   (CN) .......................... 201910169178.1

(51) Int. Cl.
| | | |
|---|---|---|
| *H04L 12/10* | (2006.01) | |
| *H04L 5/00* | (2006.01) | |
| *H04L 29/08* | (2006.01) | |
| *H04B 1/40* | (2015.01) | |

(52) U.S. Cl.
CPC .............. *H04L 12/10* (2013.01); *H04B 1/40* (2013.01); *H04L 5/0051* (2013.01); *H04L 67/12* (2013.01)

(58) Field of Classification Search
CPC ................................................ H04L 12/40136
See application file for complete search history.

(56) References Cited

U.S. PATENT DOCUMENTS

| | | | | | |
|---|---|---|---|---|---|
| 5,940,450 | A | * | 8/1999 | Koslov ............... | H04L 27/3827 375/344 |
| 6,606,129 | B1 | * | 8/2003 | Limberg .............. | H04N 5/4446 348/614 |
| 6,643,334 | B1 | * | 11/2003 | Limberg .................. | H04N 5/50 375/321 |
| 7,286,597 | B2 | * | 10/2007 | Buchwald ............. | H04L 7/0274 375/232 |
| 7,406,088 | B2 | * | 7/2008 | Magd .................. | H04L 12/4608 370/348 |
| 8,984,304 | B2 | * | 3/2015 | Zimmerman ......... | H04W 72/04 713/300 |
| 9,077,574 | B1 | * | 7/2015 | Healey .............. | H04L 25/03057 |

(Continued)

FOREIGN PATENT DOCUMENTS

| | | | | | |
|---|---|---|---|---|---|
| KR | 20080013583 | A | * | 2/2008 | ............. H04L 69/18 |
| WO | WO-2019211103 | A1 | * | 11/2019 | ............. H04L 69/18 |

*Primary Examiner* — Berhanu Tadese

(57) ABSTRACT

Embodiments described herein provide a method for waking a first node in a low power mode. A network comprises at least the first node and a second node in an awake mode where the first and second nodes have respective transceivers coupled via substantially fixed communication pathways. The transceiver of the second node obtains a training signal designed to be transmitted at a pre-defined symbol rate and transmits the training signal at a symbol rate lower than the pre-defined symbol rate to the physical layer of the first node for a predetermined duration of time. The second node, in response to receiving the training signal transitions from the low power mode to an awake state.

20 Claims, 3 Drawing Sheets

(56) References Cited

U.S. PATENT DOCUMENTS

| | | | |
|---|---|---|---|
| 9,577,708 B1* | 2/2017 | McClellan | H04B 1/40 |
| 9,866,425 B1* | 1/2018 | Lo | H04L 69/323 |
| 2002/0034262 A1* | 3/2002 | Citta | H04L 27/0014 |
| | | | 375/298 |
| 2002/0061012 A1* | 5/2002 | Thi | H04M 7/125 |
| | | | 370/352 |
| 2006/0013295 A1* | 1/2006 | Kuijk | H04B 3/143 |
| | | | 375/229 |
| 2006/0045002 A1* | 3/2006 | Lee | H04L 1/0643 |
| | | | 370/208 |
| 2006/0182171 A1* | 8/2006 | Kuijk | H04B 3/141 |
| | | | 375/229 |
| 2009/0013307 A1* | 1/2009 | Raghavan | G06F 30/20 |
| | | | 717/106 |
| 2010/0046543 A1* | 2/2010 | Parnaby | H04L 12/12 |
| | | | 370/465 |
| 2010/0111081 A1* | 5/2010 | Diab | G06F 1/3234 |
| | | | 370/389 |
| 2010/0241880 A1* | 9/2010 | Wertheimer | G06F 1/3203 |
| | | | 713/310 |
| 2011/0022716 A1* | 1/2011 | Diab | H04L 12/12 |
| | | | 709/231 |
| 2011/0022923 A1* | 1/2011 | Diab | G06F 11/10 |
| | | | 714/752 |
| 2011/0069789 A1* | 3/2011 | Xu | H04L 27/38 |
| | | | 375/326 |
| 2011/0182519 A1* | 7/2011 | Craddock | G01J 9/00 |
| | | | 382/190 |
| 2011/0299410 A1* | 12/2011 | Diab | G06Q 30/0226 |
| | | | 370/252 |
| 2012/0281981 A1* | 11/2012 | Le Taillandier De Gabory | H04B 10/25133 |
| | | | 398/29 |
| 2013/0189932 A1* | 7/2013 | Shen | H04W 52/0232 |
| | | | 455/68 |
| 2013/0315080 A1* | 11/2013 | Diab | H04L 1/0002 |
| | | | 370/252 |
| 2013/0330082 A1* | 12/2013 | Perez De Aranda Alonso | H04J 14/08 |
| | | | 398/98 |
| 2014/0119381 A1* | 5/2014 | Diab | H04L 41/085 |
| | | | 370/431 |
| 2014/0258738 A1* | 9/2014 | Greenwalt | G06F 1/3278 |
| | | | 713/300 |
| 2016/0204900 A1* | 7/2016 | Tu | H04L 12/12 |
| | | | 714/776 |
| 2017/0072876 A1* | 3/2017 | Rajan | H04L 69/08 |
| 2017/0180161 A1* | 6/2017 | Dai | H04L 25/03057 |
| 2017/0250858 A1* | 8/2017 | Chae | H04L 12/40 |
| 2018/0041304 A1* | 2/2018 | Shen | H04L 27/04 |
| 2019/0181872 A1* | 6/2019 | Lin | H04B 1/401 |
| 2020/0177522 A1* | 6/2020 | Lo | H04B 3/50 |
| 2020/0287730 A1* | 9/2020 | Dai | H04B 1/40 |

* cited by examiner

SYSTEMS AND METHODS FOR WAKING A NETWORK INTERFACE DEVICE IN A LOW POWER MODE

CROSS-REFERENCE TO RELATED APPLICATION

This application claims the benefit under 35 U.S.C. § 119(a) of Chinese Patent Application No. 201910169178.1, filed Mar. 6, 2019, which is hereby incorporated by reference herein in its entirety.

FIELD OF USE

This disclosure is related generally to communication networks and, more particularly, to generation of wake-up pulses for supporting Energy Efficient Ethernet.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

Gigabit Ethernet is designed to transmit Ethernet frames at a rate of one gigabit per second (1 Gb/s). Gigabit Ethernet uses physical layer (PHY) processing devices such as 1000 Base-T1, as defined by the Institute of Electrical and Electronics Engineers (IEEE) 802.3 bp Ethernet standard. A 1000 Base-T1 PHY processing device supports full-duplex operation at 1 Gb/s over a single twisted copper wire pair. A 1000 Base-T1 PHY processing device can operate in severely constrained environments, such as automotive and industrial environments in which certain requirements (e.g., electromagnetic compatibility and temperature requirements) must be met.

SUMMARY

Embodiments described herein provide a method for waking a physical layer of a first node in a low power mode. A network comprises the first node and a second node in an awake mode, where the first and second nodes each have respective transceivers coupled via substantially fixed communication pathways. A transceiver of the second node obtains a signal designed to be transmitted at a pre-defined symbol rate and transmits the signal at a symbol rate lower than the pre-defined symbol rate to the physical layer of the first node for a predetermined duration of time. The transmitted signal is configured to transition the first node from the low power mode to an awake state. The method further includes stopping the transmission of the signal at the end of the predetermined duration of time.

The signal is a training signal as defined in IEEE 802.3 bp in accordance with embodiments described herein.

The signal is a pseudo-random sequence in accordance with embodiments described herein.

The pre-defined symbol rate for the signal is 750 MHz in accordance with embodiments described herein.

The signal is transmitted to the physical layer of the first node at a symbol rate of 48.875 MHz in accordance with embodiments described herein.

The signal is transmitted to the physical layer of the first node at a symbol rate of 93.75 MHz in accordance with embodiments described herein.

The predetermined duration for which the signal is transmitted to the physical layer of the first node is 1 ms in accordance with embodiments described herein.

Embodiments described herein also provide a method for waking the physical layer of the first node in the lower power mode according to claim 1, where the network is an automotive network and the first node and the second node correspond to at least two different components within an automobile.

The network is an industrial network comprising at least the first node and the second node in accordance with embodiments described herein.

The transceiver of the first node is coupled to the transceiver of the second node by a single twisted pair of cables in accordance with embodiments described herein.

Embodiments described herein provide a network, comprising a first network interface device and a second network interface device. The first network interface device includes a transceiver, the transceiver having control circuitry configured to generate a signal designed to be transmitted at a pre-defined symbol rate to a transceiver of the second network interface device in low power mode, transmit the signal at a symbol rate lower than the pre-defined symbol rate for a pre-determined duration of time, wherein the transmitted signal is configured to transition the second network interface device from the low power mode to an awake state, and stop the transmission of the signal at the end of the predetermined duration of time.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for generating a wake-up signal to wake up a 1000 Base-T1 PHY processing device from a low power mode in severely constrained environments.

It is desirable for 1000 Base-T1 PHY processing devices to enter a low power mode to conserve power consumption and improve the overall efficiency of the automotive or industrial network. One approach to conserve power has been to keep the 1000 Base-T1 PHY processing devices in the low power mode and periodically waking up the 1000 Base-T1 PHY processing device by sending a wake-up signal when the 1000 Base-T1 PHY processing device is needed. However, waking up the 1000 Base-T1 PHY processing devices presents a challenge in severely constrained environments, such as automotive and industrial environments. Specifically, the presence of electromagnetic noise may be misinterpreted as a wake-up signal resulting in the 1000 Base-T1 PHY processing device being 'woken' up from the low power mode.

Accordingly, there is a need for an efficient mechanism for waking up the 1000 Base-T1 PHY processing devices in a low power mode by generating a wake-up signal that can be uniquely recognized by the 1000 Base-T1 PHY processing device in low power mode. In accordance with implementations of the of the subject matter of this disclosure, a first 1000 Base-T1 PHY processing device in a low power mode is configured to receive a training signal transmitted at a symbol rate lower than a pre-defined transmission symbol rate from a fully powered up second 1000 Base-T1 PHY processing device within the network. The training signal transmitted at a symbol rate lower than a predefined transmission symbol rate serves as a wake-up pulse bringing the first 1000 Base-T1 PHY processing device from a low powered mode to a fully powered up state.

Figure 1:
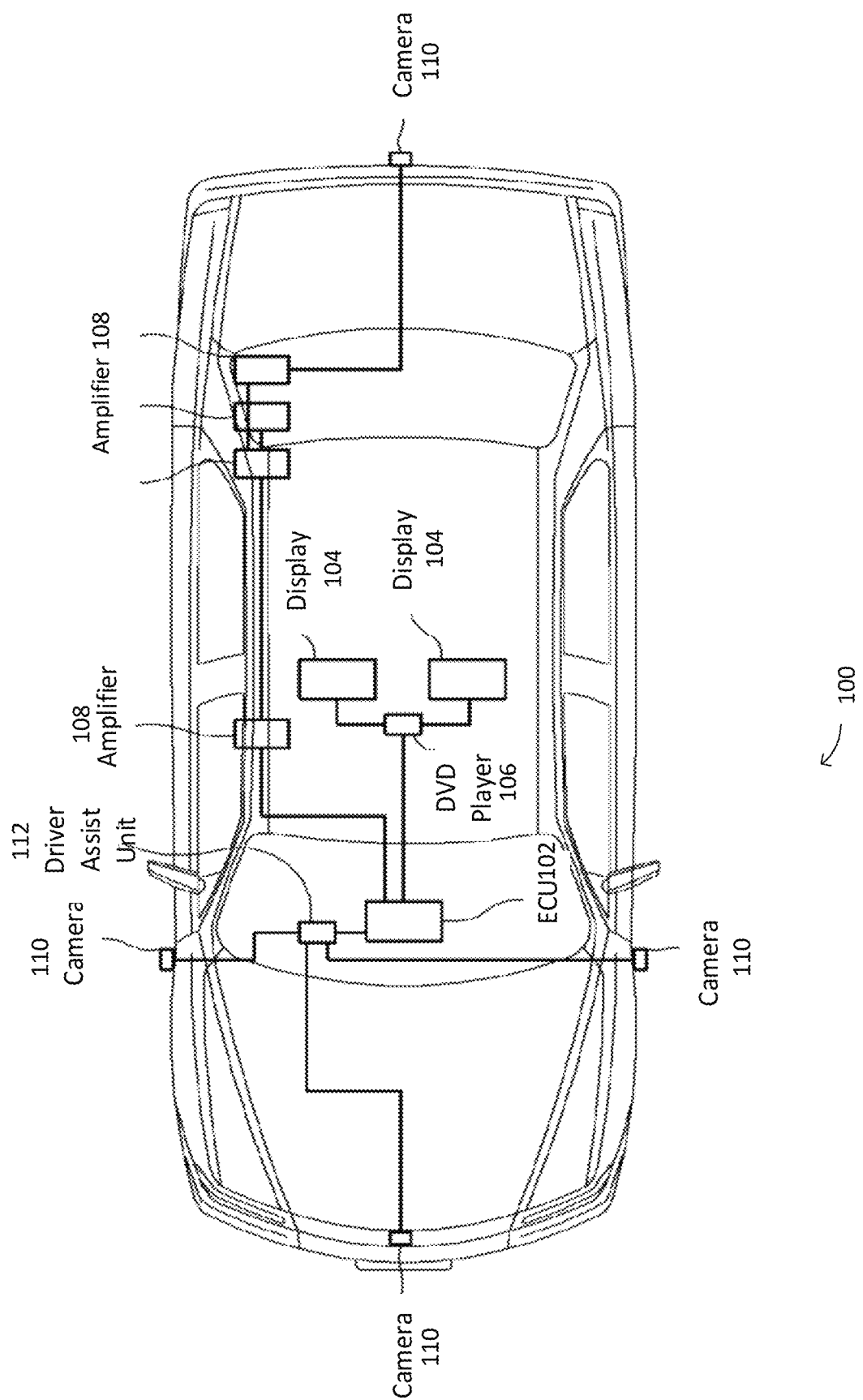
FIG. 1 is a block diagram of an automotive environment having a number of 1000 Base-T1 PHY processing devices which may incorporate implementations of the subject matter of this disclosure.

FIG. 1 is a block diagram illustrating an automotive environment having a number of 1000 Base-T1 PHY processing devices which may incorporate implementations of the subject matter of this disclosure, according to some embodiments described herein. As shown in FIG. 1, an automotive network 100 includes a plurality of 1000 Base-T1 PHY processing devices. In the example embodiment shown in FIG. 1, the automotive network 100 includes an Electronic Control Unit (ECU) 102, displays 104, a DVD player 106, amplifiers 108, cameras 110, and a Driver Assist Unit 112. A person skilled in the art will appreciate that any number of 1000 Base-T1 PHY processing devices can be included within the automotive network 100 of FIG. 1.

In accordance with an embodiment of the subject matter of this disclosure, some of the 1000 Base-T1 PHY processing devices (e.g., ECU 102, cameras 110, and Driver Assist Unit 112) are in a fully powered state at all times. Moreover, certain 1000 Base-T1 PHY processing devices (e.g., displays 104, DVD player 106, and amplifiers 108) can be in a low power mode when they are not in use to reduce the overall power consumption. As discussed above, there are challenges in waking up these low power mode devices in an automotive environment (e.g., due to the presence of electromagnetic noise).

In accordance with an embodiment of the subject matter of this disclosure, ECU 102, when waking up the amplifiers 108 from a low power mode, periodically transmits a training signal to the amplifiers 108 for a predetermined duration. For instance, the training signal can be a double polarity Pulse Amplitude Modulated (PAM) signal. A PAM signal has a pre-defined transmission symbol rate of 750 MHz. However, in accordance with the subject matter of this disclosure, ECU 102 transmits the PAM signal at a symbol rate lower than the predefined transmission symbol rate. For example, in one embodiment, ECU 102 reduces the symbol rate to be ⅛ or 1/16 of the predefined transmission symbol rate (i.e., reduce the symbol rate from 750 MHz to 93.75 MHz or 46.875 MHz). In an embodiment, the signal amplitude of the PAM signal can remain unchanged from the normal mode.

In accordance with an embodiment of the subject of this disclosure, the lower data rate results in less channel loss and signal distortion, thereby improving the Signal to Noise ratio (SNR) without requiring receiver adaptation. Moreover, a double polarity PAM signal also results in a larger signal power and SNR, thereby further improving the immunity to external noise. In accordance with an embodiment of the subject matter of this disclosure, signals with pseudo-random results in wider signal spectrum which reduces the susceptibility for misdetection with noise within the automotive network 100.

An additional advantage of using a double polarity PAM signal is that the signal is readily available in IEEE 802.11 bp thus avoiding additional receiver adaptation. In an embodiment, the transmitted PAM signal can be detected at both 1000 Base-T1 and 100Base-T1 PHY processing devices. In accordance with an embodiment of the subject matter of this disclosure, the predetermined duration is 1 ms (±0.3 ms).

Figure 2:
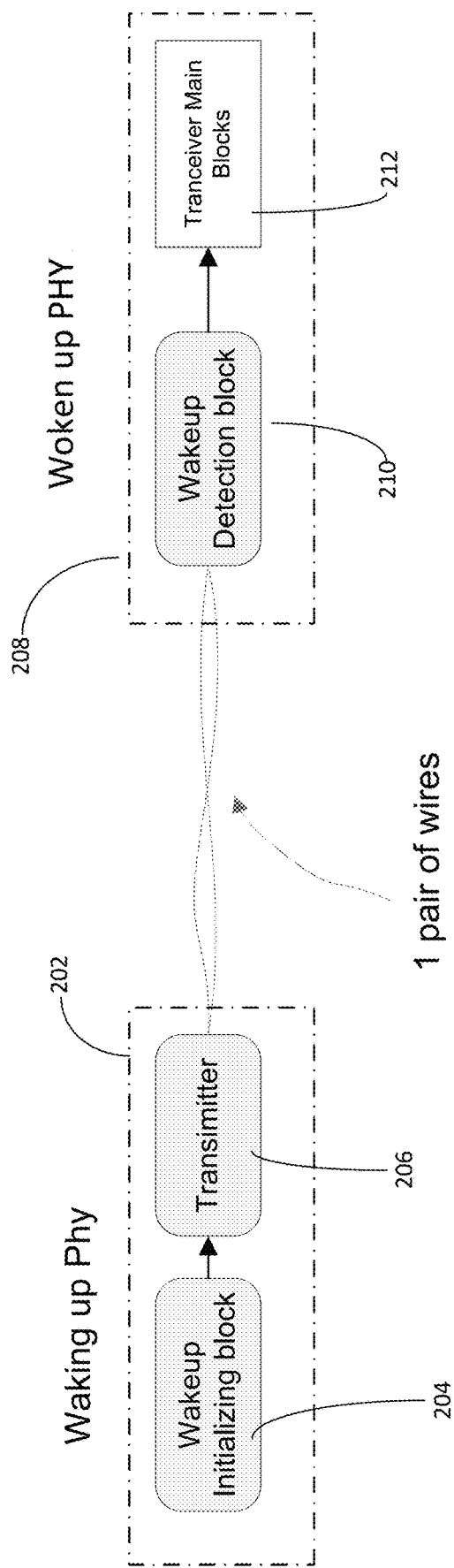
FIG. 2 is a high-level block diagram of two 1000 Base-T1 PHY processing devices which may incorporate implementations of the subject matter of this disclosure.

FIG. 2 is a high-level block diagram of two 1000 Base-T1 PHY processing devices which may incorporate implementations of the subject matter of this disclosure. As shown in FIG. 2, a waking-up PHY processing device 202 (e.g., ECU 102) includes a wakeup initializing block 204 and a transmitter 206. A PHY processing device 208 (e.g., amplifiers 108) to be woken up includes a wakeup detection block 210 and transceiver main blocks 212. In accordance with an embodiment of the subject matter of this disclosure, PHY processing device 202 is connected to PHY processing device 208 by a single twisted pair of cables.

The PAM signal having a random sequence is generated at the wakeup initializing block 204. The transmitter 206 periodically transmits the PAM signal at a lower symbol rate (e.g., 46.875 MHz or 93.75 MHz) to the PHY processing device 208 via the single twisted pair of cables. The PHY processing device 208 is in a low power mode where only a wake-up pulse from a fully powered device (such as ECU 102) can successfully wake up low power mode PHY processing device 208. The wakeup detection block 210, in response to receiving the wake-up pulse (i.e., the PAM signal), begins the wake-up process via the transceiver main blocks 212.

Figure 3:
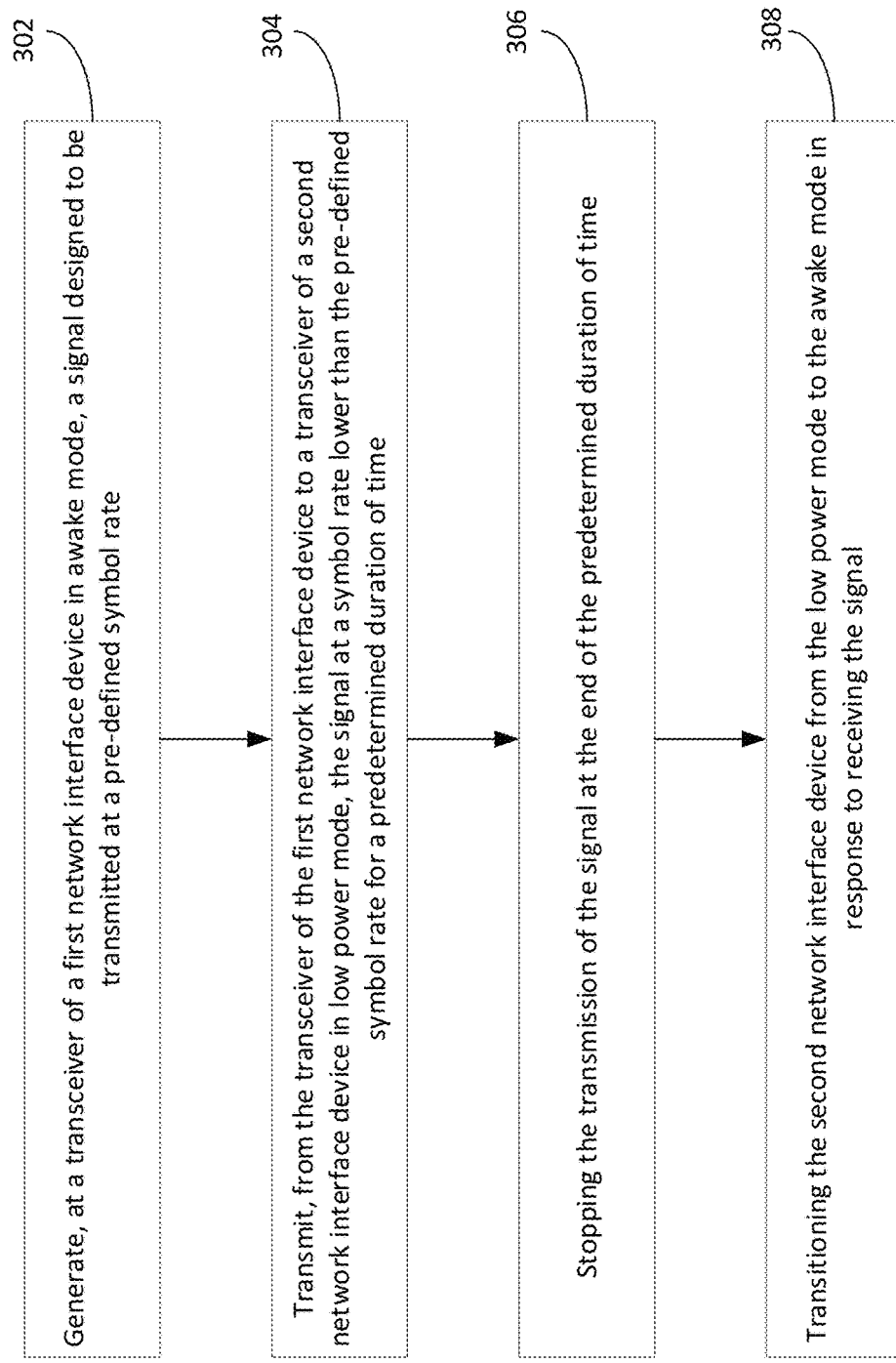
FIG. 3 is a flow diagram of a method implementing the subject matter of this disclosure.

A method 300 according to implementations of the subject matter of this disclosure is diagrammed in FIG. 3. At 302, a transmitter of a first network interface device in a fully powered state generates a training signal having a predefined symbol rate for transmission. For example, as discussed above in connection with FIG. 2, the wakeup initializing block 204 generates a PAM signal designed to be normally transmitted at a symbol rate of 750 MHz. At 304, the transmitter of the first network interface device transmits the generated training signal to the transceiver of a second network interface device in low power mode at a symbol rate lower than the predefined transmission symbol rate for the training signal. For example, as discussed above in connection with FIG. 2, transmitter 206 of PHY processing device 202 transmits the PAM signal at a lower symbol rate (e.g., 46.875 MHz or 93.75 MHz) to the PHY processing device 208 via the single twisted pair of cables.

At 304, the first network interface device stops the transmission of the training signal after a predetermined duration has expired (e.g., 1 ms). At 306, the second network device, in response to receiving the training signal transmitted at a lower symbol rate, is transitioned from the low power mode to a fully powered on state.

As used herein and in the claims which follow, the construction "one of A and B" shall mean "A or B."

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 3 does not necessarily require the particular order shown, or sequential order, to achieve desirable results. In certain implementations, multitasking and parallel processing may be advantageous. Other variations are within the scope of the following claims.

What is claimed is:

1. A method for waking a physical layer of a first node in a low power mode, the first node being in a network comprising at least the first node and a second node in an awake mode, the first and second nodes having transceivers coupled via substantially fixed communication pathways, the method comprising:
   obtaining, at a transceiver of the second node, a signal designed to be transmitted at a pre-defined symbol rate;
   reducing, at the transceiver of the second node, the pre-defined symbol rate to a second transmission symbol rate lower than the pre-defined symbol rate;
   transmitting, from the transceiver of the second node to the physical layer of the first node, the signal at the reduced second transmission symbol rate for a predetermined duration of time, wherein the transmitted signal is configured to transition the first node from the low power mode to an awake state; and
   stopping the transmission of the signal at the end of the predetermined duration of time.

2. The method for waking the physical layer of the first node in the low power mode according to claim 1, wherein the signal is a training signal as defined in IEEE 802.3 bp.

3. The method for waking the physical layer of the first node in the low power mode according to claim 1, wherein the signal is a pseudo-random sequence.

4. The method for waking the physical layer of the first node in the low power mode according to claim 1, wherein the pre-defined symbol rate for the signal is 750 MHz.

5. The method for waking the physical layer of the first node in the low power mode according to claim 1, wherein the signal is transmitted to the physical layer of the first node at a symbol rate of 48.875 MHz.

6. The method for waking the physical layer of the first node in the low power mode according to claim 1, wherein the signal is transmitted to the physical layer of the first node at a symbol rate of 93.75 MHz.

7. The method for waking the physical layer of the first node in the low power mode according to claim 1, wherein the predetermined duration for which the signal is transmitted to the physical layer of the first node is 1 ms.

8. The method for waking the physical layer of the first node in the lower power mode according to claim 1, wherein:
   the network is an automotive network; and
   the first node and the second node correspond to at least two different components within an automobile.

9. The method for waking the physical layer of the first node in the low power mode according to claim 1, wherein the network is an industrial network comprising at least the first node and the second node.

10. The method for waking the physical layer of the first node in the low power mode according to claim 1, wherein the transceiver of the first node is coupled to the transceiver of the second node by a single twisted pair of cables.

11. A first network interface device having a transceiver, the transceiver having control circuitry configured to:
   generate a signal designed to be transmitted at a pre-defined symbol rate to a transceiver of a second network interface device in low power mode;
   reduce the pre-defined symbol rate to a second transmission symbol rate lower than the pre-defined symbol rate;
   transmit the signal at the reduced second transmission symbol rate for a pre-determined duration of time, wherein the transmitted signal is configured to transition the second network interface device from the low power mode to an awake state; and
   stop the transmission of the signal at the end of the predetermined duration of time.

12. The first network interface device according to claim 11, wherein the signal is a training signal as defined in IEEE 802.3 bp.

13. The first network interface device according to claim 11, wherein the signal is a pseudo-random sequence.

14. The first network interface device according to claim 11, wherein the pre-defined symbol rate for the signal is 750 MHz.

15. The first network interface device according to claim 11, wherein the signal is transmitted to the second network interface device at a symbol rate of 48.875 MHz.

16. The first network interface device according to claim 11, wherein the signal is transmitted to the second network interface device at a symbol rate of 93.75 MHz.

17. The first network interface device according to claim 11, wherein the predetermined duration for which the signal is transmitted to the second network interface device is 1 ms.

18. The first network interface device according to claim 11, wherein:
   the first network interface device and the second network interface device are part of an automotive network; and
   the first network interface device and the second network interface device correspond to at least two different components within an automobile.

19. The first network interface device according to claim 11, wherein the first network interface device and the second network interface device are part of an industrial network; and
   the first network interface device and the second network interface device correspond to at least two different components within the industrial network.

20. The first network interface device according to claim 11, wherein the transceiver of the first network interface device is coupled to the transceiver of the second network interface device by a single twisted pair of cables.

* * * * *